United States Patent
Yang et al.

(10) Patent No.: US 11,232,438 B2
(45) Date of Patent: Jan. 25, 2022

(54) METHOD AND SYSTEM FOR AUTHENTICATING TRANSACTION REQUEST FROM DEVICE

(71) Applicant: SAMSUNG ELECTRONICS CO., LTD., Suwon-si (KR)

(72) Inventors: Do-jun Yang, Yongin-si (KR); Sun-eung Park, Suwon-si (KR); Jin-goo Seo, Seoul (KR); Soo-in Jang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 16/252,109

(22) Filed: Jan. 18, 2019

(65) Prior Publication Data

US 2019/0172056 A1 Jun. 6, 2019

Related U.S. Application Data

(63) Continuation of application No. 13/965,364, filed on Aug. 13, 2013, now abandoned.

(30) Foreign Application Priority Data

Aug. 23, 2012 (KR) ........................ 10-2012-0092541

(51) Int. Cl.
*G06Q 20/38* (2012.01)
*G06Q 20/32* (2012.01)

(52) U.S. Cl.
CPC ......... *G06Q 20/382* (2013.01); *G06Q 20/327* (2013.01)

(58) Field of Classification Search
CPC ............... G06Q 20/382; G06Q 20/327; G06Q 20/40145; G06Q 20/0855; G06Q 20/3278;

(Continued)

(56) References Cited

U.S. PATENT DOCUMENTS

| 6,703,918 B1 | 3/2004 | Kita |
| 7,242,277 B2 | 7/2007 | Minemura |

(Continued)

FOREIGN PATENT DOCUMENTS

| CN | 1514635 A | 7/2004 |
| CN | 201226167 Y | 4/2009 |

(Continued)

OTHER PUBLICATIONS

Communication dated Oct. 11, 2019, issued by the Korean Intellectual Property Office in counterpart Korean Application No. 10-2019-0077158.

(Continued)

*Primary Examiner* — Florian M Zeender
*Assistant Examiner* — Milena Racic
(74) *Attorney, Agent, or Firm* — Sughrue Mion, PLLC

(57) ABSTRACT

A device and method are provided. The device includes a controller, a memory, and a transceiver. The controller generates authentication information based on a user input to the device. The memory stores the generated authentication information. The transceiver receives authentication information, which is generated by a point of sale (POS) terminal based on a user input to the POS terminal, from the POS terminal, when the device enters within a predetermined range from the POS terminal. The controller compares the generated authentication information with the received authentication information, and provides card information which is used in a transaction with respect to an item or a service to the POS terminal based on a result of the comparison.

18 Claims, 13 Drawing Sheets

(58) Field of Classification Search
CPC .... G06Q 20/20; G06Q 20/3674; G06Q 20/40; G06Q 20/3829; G06Q 20/326; H04B 5/0031
See application file for complete search history.

(56) References Cited

U.S. PATENT DOCUMENTS

| | | | | |
|---|---|---|---|---|
| 8,195,576 | B1* | 6/2012 | Grigg | G06Q 20/40145 |
| | | | | 705/67 |
| 8,751,801 | B2* | 6/2014 | Harris | G06F 21/31 |
| | | | | 713/168 |
| 9,361,619 | B2* | 6/2016 | Varadarajan | H04L 63/0853 |
| 10,104,074 | B2* | 10/2018 | Milgramm | G06F 21/33 |
| 2002/0190124 | A1 | 12/2002 | Piotrowski | |
| 2007/0022058 | A1 | 1/2007 | Labrou et al. | |
| 2007/0181672 | A1 | 8/2007 | Sawamura | |
| 2008/0126260 | A1 | 5/2008 | Cox et al. | |
| 2008/0180212 | A1 | 7/2008 | Aikawa et al. | |
| 2010/0032500 | A1 | 2/2010 | Righini | |
| 2010/0082490 | A1 | 4/2010 | Rosenblatt et al. | |
| 2010/0161488 | A1* | 6/2010 | Evans | G06Q 20/20 |
| | | | | 705/44 |
| 2010/0235313 | A1 | 9/2010 | Rea et al. | |
| 2010/0274726 | A1 | 10/2010 | Florek et al. | |
| 2010/0325002 | A1 | 12/2010 | Rothschild | |
| 2011/0019125 | A1 | 1/2011 | Nakahama et al. | |
| 2011/0191252 | A1 | 8/2011 | Dai | |
| 2012/0078783 | A1 | 3/2012 | Park | |
| 2012/0150669 | A1 | 6/2012 | Langley et al. | |
| 2012/0159599 | A1 | 6/2012 | Szoke et al. | |
| 2012/0259782 | A1* | 10/2012 | Hammad | G06Q 20/382 |
| | | | | 705/44 |
| 2013/0014760 | A1 | 1/2013 | Matula, Jr. et al. | |
| 2013/0054336 | A1* | 2/2013 | Graylin | G06Q 40/02 |
| | | | | 705/14.26 |
| 2013/0136363 | A1 | 5/2013 | Na | |
| 2013/0147603 | A1* | 6/2013 | Malhas | G06K 9/00597 |
| | | | | 340/5.83 |
| 2014/0021467 | A1 | 1/2014 | Koezuka et al. | |
| 2014/0214673 | A1 | 7/2014 | Baca et al. | |
| 2015/0066620 | A1* | 3/2015 | Roskind | G07F 7/1008 |
| | | | | 705/14.23 |
| 2015/0095133 | A1* | 4/2015 | Parker | G06Q 20/202 |
| | | | | 705/14.38 |

FOREIGN PATENT DOCUMENTS

| | | |
|---|---|---|
| CN | 101770668 A | 7/2010 |
| CN | 101853542 A | 10/2010 |
| CN | 101901517 A | 12/2010 |
| EP | 1768057 A1 | 3/2007 |
| JP | 2001-167054 A | 6/2001 |
| JP | 2004-030176 A | 1/2004 |
| JP | 2005-242768 A | 9/2005 |
| JP | 2005-346606 A | 12/2005 |
| JP | 2006-155636 A | 6/2006 |
| JP | 2006-221515 A | 8/2006 |
| JP | 2006-350588 A | 12/2006 |
| JP | 2007-66330 A | 3/2007 |
| JP | 2008-084227 A | 4/2008 |
| JP | 2009-75907 A | 4/2009 |
| KR | 10-0407834 B1 | 12/2003 |
| KR | 10-2005-0014052 A | 2/2005 |
| KR | 20-0407834 Y1 | 2/2006 |
| KR | 10-2007-0057537 A | 6/2007 |
| KR | 10-2008-0067967 A | 7/2008 |
| KR | 10-2012-0014480 A | 2/2012 |
| RU | 2007 119 576 A | 12/2008 |
| WO | 2005/122035 A1 | 12/2005 |

OTHER PUBLICATIONS

Communication dated Oct. 28, 2019, issued by the Japanese Patent Office in counterpart Japanese Application No. 2018-155309.
Communication dated Dec. 12, 2019, issued by the Indian Patent Office in counterpart Indian Application No. 594/MUMNP/2015.
Communication dated Mar. 28, 2019, issued by the Korean Intellectual Property Office in counterpart Korean Application No. 10-2012-0092541.
Communication (Notice of Amendment Dismissal) dated May 31, 2019, issued by the Korean Intellectual Property Office in counterpart Korean Application No. 10-2012-0092541.
Communication (Reexamination) dated May 31, 2019, issued by the Korean Intellectual Property Office in counterpart Korean Application No. 10-2012-0092541.
Communication dated Jan. 14, 2020 issued by the Brazilian Patent Office in counterpart Brazilian Patent Application No. BR1120150038484.
Communication dated May 24, 2016 issued by Russian Intellectual Property Office in counterpart Russian Applicaiton No. 2015109972/08(015749).
Communication dated Sep. 20, 2018 from the Korean Intellectual Property Office in counterpart application No. 10-2012-0092541.
Communication dated Aug. 14, 2017 from the Japanese Patent Office in counterpart application No. 2013-173102.
Communication dated Oct. 31, 2017 from the State Intellectual Property Office of the P.R.C. in counterpart application No. 201310372851.4.
Search Report dated Nov. 28, 2013, issued by the European Patent Office in counterpart European Application No. 13181595.3.
Search Report dated Sep. 30, 2013, issued by the International Searching Authority in counterpart International Application No. PCT/KR2013/005880.
Written Opinion dated Sep. 30, 2013, issued by the International Searching Authority in counterpart International Application No. PCT/KR2013/005880.
Communication dated Apr. 23, 2018 issued by the Japanese Patent Office in counterpart Japanese Application No. 2013-173102.
Communication dated May 24, 2016 issued by Russian Intellectual Property Office in counterpart Russian Applicaiton No. 2015109972/08.
Communication dated Nov. 14, 2016, issued by the Taiwanese Patent Office in counterpart Taiwanese application No. 102124937.
Communication dated Oct. 31, 2017, issued by the Chinese Patent Office in counterpart Chinese application No. 201310372851.4.

* cited by examiner

METHOD AND SYSTEM FOR AUTHENTICATING TRANSACTION REQUEST FROM DEVICE

CROSS-REFERENCE TO RELATED PATENT APPLICATION

This is a continuation of U.S. patent application Ser. No. 13/965,364, filed Aug. 13, 2013, which claims priority from Korean Patent Application No. 10-2012-0092541, filed on Aug. 23, 2012, in the Korean Intellectual Property Office, the disclosure of which is incorporated herein by reference in its entirety.

BACKGROUND

1. Field

Methods, systems, and devices consistent with exemplary embodiments relate to authenticating a transaction request from a device by using authentication information that is generated in the device and authentication information that is generated in a point of sale (POS) terminal.

2. Description of the Related Art

Due to developments in a data transmission technology and network technology, mobile devices are commonly used, thus, a technology for providing a transaction service by using the mobile device becomes an issue. In order to use a mobile transaction service, a user may use a subscriber identity module (SIM), and in this regard, the user may insert or mount a SIM card storing credit card information, financial information, or the like into a mobile phone or a smart phone and this stored information may be provided to the mobile transaction service.

However, when the user loses the SIM card or the mobile device having the SIM card mounted therein, a transaction by a third party may be possible, such that the mobile transaction service using the SIM card may cause a security problem. In order to address the security problem, access to the data of the mobile device or a point of sale (POS) terminal may be restricted by requesting the user to input a password or the like. However, when the PIN code is exposed, security of the transaction information cannot be assured.

SUMMARY

One or more exemplary embodiments provide a method and system for authenticating a transaction request from a device by using authentication information that is generated in the device and authentication information that is generated in a point of sale (POS) terminal.

One or more exemplary embodiments also provide a method and system for authenticating a transaction request from a device by using authentication information with respect to at least one of a fingerprint, a pupil, a voice, and a signature which are of a user.

According to an aspect of an exemplary embodiment, there is provided a method of requesting, by a device, a transaction with a point of sale (POS) terminal, the method including storing authentication information that is generated by the device based on a user input to the device; and when the device approaches to within a predetermined range from the POS terminal, providing the authentication information to the POS terminal, wherein the authentication information that is provided to the POS terminal is compared with authentication information that is generated by the POS terminal based on a user input to the POS terminal, and then is used to authenticate a transaction request from the device.

The method may further include providing transaction information to the POS terminal, and when the transaction request from the device is authenticated, the transaction information that is provided to the POS terminal may be then provided from the POS terminal to a transaction server.

When the transaction request from the device is authenticated, at least one of the authentication information that is provided to the POS terminal and the authentication information that is generated by the POS terminal may be then provided from the POS terminal to the transaction server.

The authentication information that is provided to the transaction server may be used by the transaction server to perform the transaction request from the device.

The operation of providing the transaction information may include providing the transaction information to the POS terminal when the transaction request from the device is authenticated.

The authentication information may include information about at least one of an image of a pupil of a user, a voice of the user, a fingerprint of the user, and a signature of the user.

The authentication information may include link information for downloading information about at least one of an image of a pupil of a user, a voice of the user, a fingerprint of the user, and a signature of the user.

The transaction information may include at least one of card information, coupon information, and user information.

According to an aspect of another exemplary embodiment, there is provided a method of requesting, by a device, a transaction with a point of sale (POS) terminal, the method including storing authentication information that is generated by the device based on a user input to the device; when the device approaches to within a predetermined range from the POS terminal, receiving authentication information, which is generated by the POS terminal based on a user input to the POS terminal, from the POS terminal; authenticating a transaction request from the device, based on the authentication information generated by the device and the received authentication information; and providing transaction information to the POS terminal.

When the transaction request from the device is authenticated, the transaction information that is provided to the POS terminal may be then provided from the POS terminal to a transaction server.

When the transaction request from the device is authenticated, at least one of the authentication information that is provided to the POS terminal and the authentication information that is generated by the POS terminal may be then provided from the POS terminal to the transaction server.

The authentication information that is provided to the transaction server may be used by the transaction server to perform the transaction request from the device.

The operation of providing the transaction information may include an providing the transaction information to the POS terminal when the transaction request from the device is authenticated.

The authentication information may include information about at least one of an image of a pupil of a user, a voice of the user, a fingerprint of the user, and a signature of the user.

The authentication information may include link information for downloading information about at least one of an image of a pupil of a user, a voice of the user, a fingerprint of the user, and a signature of the user.

The transaction information may include at least one of card information, coupon information, and user information.

According to an aspect of another exemplary embodiment, there is provided a method of authenticating, by a point of sale (POS) terminal, a transaction request from a device, the method including, when the device approaches to within a predetermined range from the POS terminal, receiving authentication information that is stored in the device from the device; generating authentication information based on a user input to the POS terminal; and comparing the received authentication information and the generated authentication information, and authenticating the transaction request from the device based on a result of the comparing.

The method may further include operations of receiving transaction information from the device; and when the transaction request from the device is authenticated, providing the received authentication information to a transaction server.

When the transaction request from the device is authenticated, at least one of the received authentication information and the generated authentication information may be then provided from the POS terminal to the transaction server.

The at least one of the received authentication information and the generated authentication information that is provided from the POS terminal to the transaction server may be used by the transaction server to perform the transaction request from the device.

According to yet another aspect of one or more exemplary embodiments, there is provided a method of authenticating, by a point of sale (POS) terminal, a transaction request from a device, the method including operations of generating authentication information based on a user input to the POS terminal; and when the device approaches to within a predetermined range from the POS terminal, providing the authentication information to the device, wherein the authentication information that is provided to the device is compared with authentication information that is generated by the device based on a user input to the device, and is used to authenticate the transaction request from the device.

According to an aspect of another exemplary embodiment, there is provided a device including an authentication information storage that stores authentication information that is generated by the device based on a user input to the device; an authentication information comparer that receives authentication information, which is generated by a point of sale (POS) terminal based on a user input to the POS terminal, from the POS terminal when the device approaches to within a predetermined range from the POS terminal, and compares the authentication information generated by the device and the received authentication information; and a transaction requester that requests a transaction with the POS terminal, based on a result of the comparing.

According to yet another aspect of one or more exemplary embodiments, there is provided a point of sale (POS) terminal including an authentication information generator that generates authentication information based on a user input to the POS terminal; and an authentication information transmitter that provides the authentication information to the device, when the device approaches to within a predetermined range from the POS terminal, wherein the authentication information that is provided to the device is compared with authentication information that is generated by the device based on a user input to the device, and is used to authenticate a transaction request from the device.

According to an aspect of another exemplary embodiment, there is provided a non-transitory computer-readable recording medium having recorded thereon a program, which when executed by a computer, performs one of the methods described above.

BRIEF DESCRIPTION OF THE DRAWINGS

The above and other aspects will become more apparent by describing in detail exemplary embodiments with reference to the attached drawings in which.

DETAILED DESCRIPTION

Figure 1:
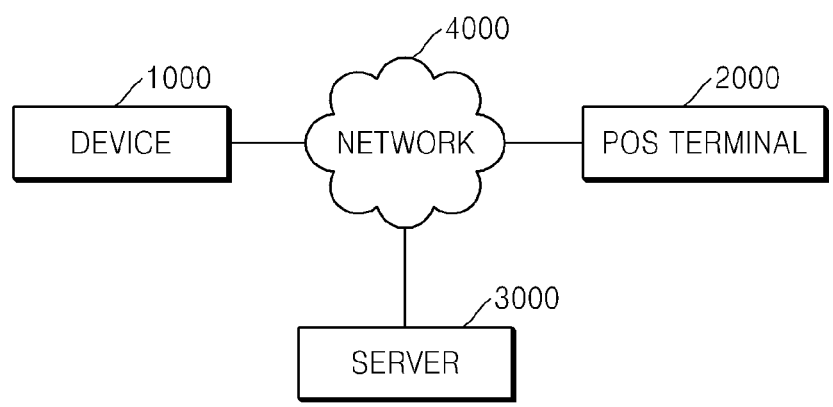
FIG. 1 is a block diagram of a system for authenticating a transaction request from a device, according to an exemplary embodiment.

Hereinafter, the exemplary embodiments will now be described more fully with reference to the accompanying drawings. The present inventive concept may, however, be embodied in many different forms and should not be construed as being limited to the exemplary embodiments set forth herein; rather, these exemplary embodiments are provided so that this disclosure will be thorough and complete, and will fully convey the present inventive concept to those of ordinary skill in the art. In the following description, well-known functions or constructions are not described in detail so as not to obscure the present inventive concept with unnecessary detail. Also, throughout the specification, like reference numerals in the drawings denote like elements.

Throughout the specification, it will also be understood that when an element is referred to as being "connected to" another element, it can be directly connected to the other element, or electrically connected to the other element while intervening elements may also be present. Also, when a part "includes" or "comprises" an element, unless there is a particular description contrary thereto, the part can further include other elements, not excluding the other elements.

Also, throughout the specification, it will be understood that when an element A and an element B perform a short-range contact, it means that the element A is located within a communication range of the element B or the element B is located within a communication range of the element A.

Expressions such as "at least one of," when preceding a list of elements, modify the entire list of elements and do not modify the individual elements of the list.

FIG. 1 is a block diagram of a system for authenticating a transaction request from a device, according to an exemplary embodiment.

As illustrated in FIG. 1, the system for authenticating the transaction request (hereinafter, referred to as the 'transaction request authenticating system') includes a device 1000, a point of sale (POS) terminal 2000, a server 3000, and a network 4000.

The device 1000 may previously generate and store authentication information of a user. As the device 1000 approaches the POS terminal 2000, the device 1000 may provide the stored authentication information to the POS terminal 2000. The authentication information may be used to authenticate a transaction request from the device 1000, and for example, the authentication information may include at least one of an image obtained by capturing a pupil of the user, a voice of the user, a fingerprint of the user, and a signature of the user.

The device 1000 may include, but is not limited to, a smart phone, a mobile phone, a personal digital assistant (PDA), a laptop, a media player, a global positioning system (GPS) apparatus, or other mobile or non-mobile apparatuses.

The POS terminal 2000 may separately generate authentication information of the user, compared to the device 1000. When the POS terminal 2000 receives the authentication information from the device 1000, the POS terminal 2000 may capture an image of the user, may record a voice of the user, may recognize a fingerprint of the user, or may receive a signature input from the user, thereby separately generating the authentication information of the user. Also, the POS terminal 2000 may authenticate the transaction request from the device 1000 by comparing the authentication information from the device 1000 with the authentication information that is generated by the POS terminal 2000.

Also, after the POS terminal 2000 authenticates the transaction request, the POS terminal 2000 may receive transaction information from the device 1000, may provide the transaction information to the server 3000, and thus may allow the server 3000 to perform the transaction.

The network 4000 may be formed as a wired network such as a wide area network (WAN), a value added network (VAN), or the like, or may be formed as a wireless network such as a mobile radio communication network, a near field communication (NFC) network, a satellite communication network, or the like. Also, the network 4000 collectively indicates data communication networks allowing network configuration elements shown in FIG. 1 to smoothly communicate with each other, and includes wired internet, wireless internet, and a mobile wireless communication network.

Figure 2:
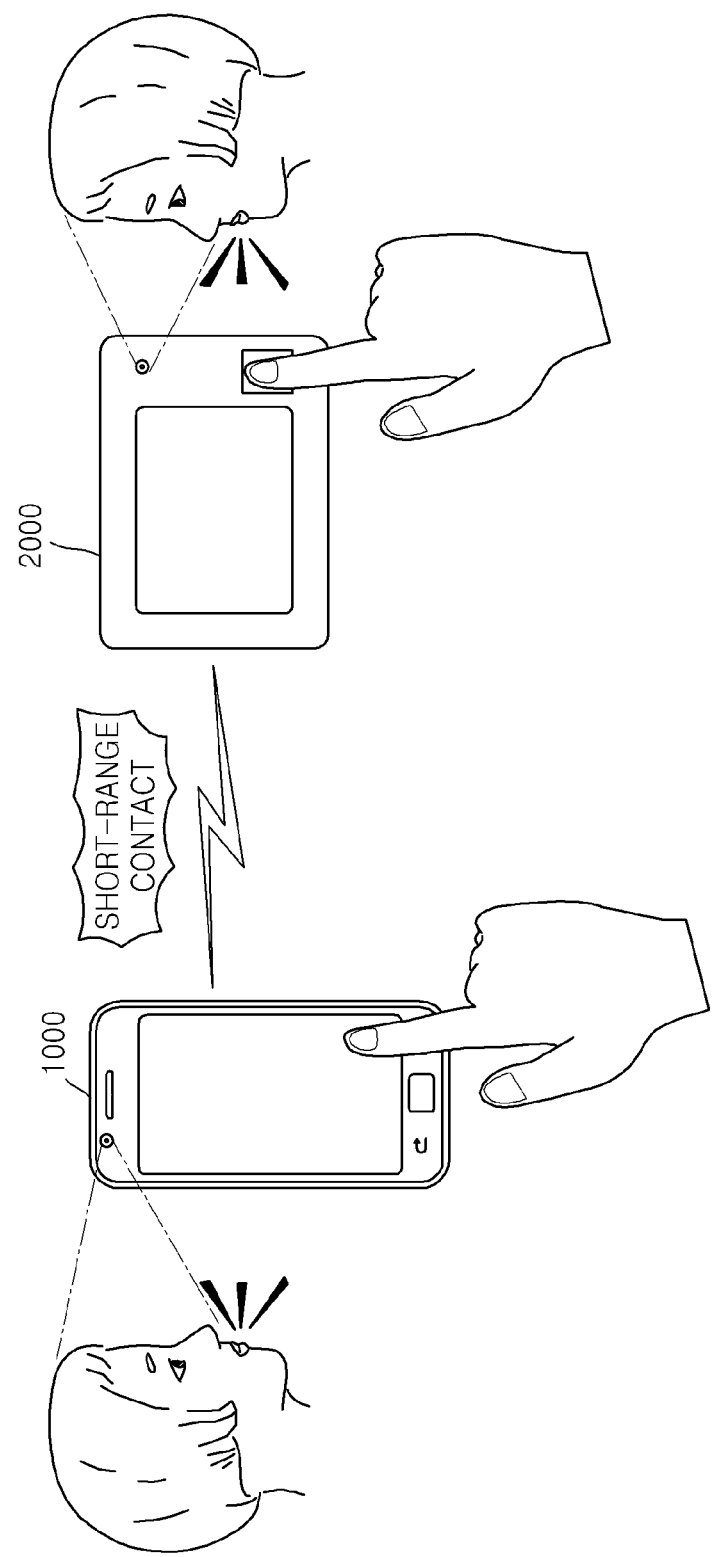
FIG. 2 illustrates an example in which, since the device and a point of sale (POS) terminal perform a short-range contact, each of the device and the POS terminal obtains authentication information of a user in a transaction request authenticating system.

FIG. 2 illustrates an example in which, since the device 1000 and the POS terminal 2000 perform a short-range contact, each of the device 1000 and the POS terminal 2000 obtains authentication information of a user in the transaction request authenticating system.

Referring to FIG. 2, the device 1000 may previously generate authentication information of the user by using several pieces of equipment that are included in the device 1000. The device 1000 may capture an image of a pupil of the user by using a camera of the device 1000 and may store the captured image, or may recognize a fingerprint of the user from a finger of the user that touches a screen of the device 1000 and may store fingerprint information. Alternatively, the device 1000 may record a voice of the user by using a microphone of the device 1000 and may store the recorded voice.

Once the device 1000 and the POS terminal 2000 approach each other to within a predetermined range, the authentication information that is previously stored in the device 1000 may be automatically transmitted to the POS terminal 2000 via a wireless personal area network (WPAN), and then the POS terminal 2000 may authenticate a transaction request from the device 1000 by comparing the authentication information from the device 1000 with the authentication information that is generated by the POS terminal 2000.

For example, the WPAN may include, but is not limited to, NFC, ZigBee communication, radio frequency identification (RFID) communication, and ultra wide band (UWB) communication.

The POS terminal 2000 may capture an image of the pupil of the user by using a camera that is included in the POS terminal 2000 or that is connected with the POS terminal 2000, and may store the captured image. Also, the POS terminal 2000 may recognize the fingerprint of the user that touches a screen of a fingerprint recognizing apparatus that is included in the POS terminal 2000 or that is connected with the POS terminal 2000, and may store fingerprint information. Also, the POS terminal 2000 may record a voice of the user by using a microphone that is included in the POS terminal 2000 or that is connected with the POS terminal 2000, and may store the recorded voice.

Figure 3:
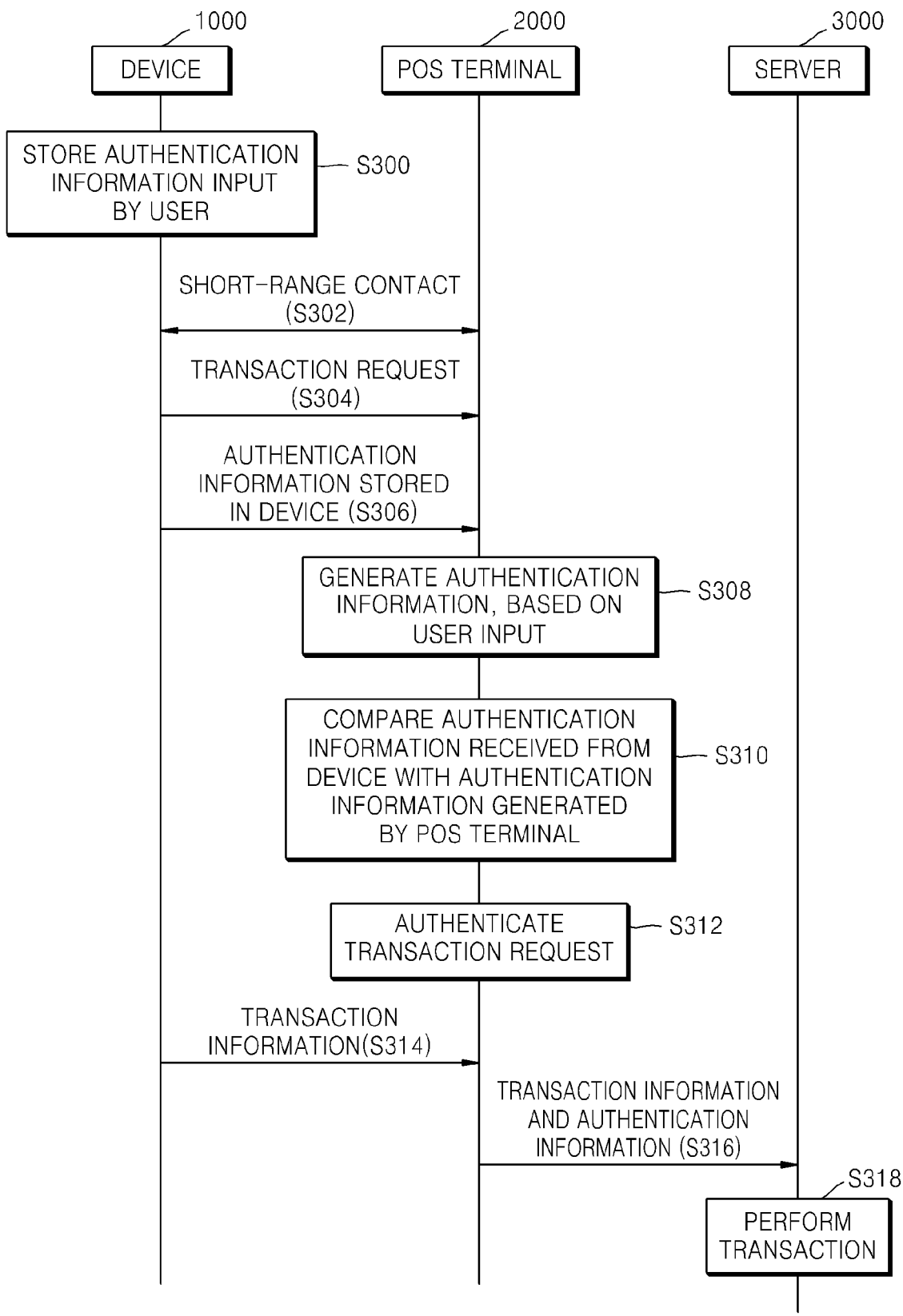
FIG. 3 is a flowchart of a method of authenticating, by the POS terminal, a transaction request from the device in the transaction request authenticating system, according to an exemplary embodiment.

FIG. 3 is a flowchart of a method of authenticating, by the POS terminal 2000, a transaction request from the device 1000 in the transaction request authenticating system, according to an exemplary embodiment of the present invention.

In operation S300, the device 1000 stores authentication information that is input by a user. The authentication information may be used to authenticate the transaction request from the device 1000 and may include information about at least one of a pupil image of the user, a voice of the user, a fingerprint of the user, and a signature of the user. The device 1000 may generate the authentication information by using at least one of a camera, a microphone, a fingerprint recognizing apparatus, and a touch screen, and may previously store the generated authentication information in its memory. Alternatively, the device 1000 may store the generated authentication information in a separate storage space.

In operation S302, the device 1000 performs a short-range contact with the POS terminal 2000. The device 1000 and the POS terminal 2000 may approach each other to within a predetermined range, and once the device 1000 and the POS terminal 2000 reach the predetermined range, the device 1000 and the POS terminal 2000 may be connected to each other via an NFC network. The connection between the device 1000 and the POS terminal 2000 may be established by exchanging messages between the device 1000 and the POS terminal 2000.

In operation S304, the device 1000 requests a transaction with the POS terminal 2000. In operation S304, since the device 1000 is within the predetermined range of the POS terminal 2000, the device 1000 may request the transaction with the POS terminal 2000.

In operation S306, the device 1000 transmits the authentication information that is stored in the device 1000 to the POS terminal 2000. Once the device 1000 is within the predetermined range of the POS terminal 2000, the device 1000 may extract the information about at least one of the pupil image of the user, the voice of the user, the fingerprint of the user, and the signature of the user from the memory or the separate storage space, and may transmit the extracted information to the POS terminal 2000. The device 1000 may store the authentication information in the separate storage space and may transmit link information for downloading the authentication information to the POS terminal 2000. The POS terminal 2000 may then use the link information to download the authentication information from the separate storage space of the device 1000.

Also, the device 1000 may display a user interface for an input of a password on the screen of the device 1000, and when the password is correctly input by the user, the device 1000 may provide the authentication information to the POS terminal 2000.

Also, according to a payment amount of types of an item to be purchased, the device 100 may transmit a preset type of authentication information to the POS terminal 2000. For example, the user may previously set types of the authentication information according to a payment amount or types of an item to be purchased, and the device 1000 may transmit the preset type of the authentication information to the POS terminal 2000. However, the present inventive concept is not limited thereto, and thus, the user may randomly preset types of the authentication information to be used. Also, when the device 1000 has transmitted the preset type of the authentication information to the POS terminal 2000, the POS terminal 2000 may authenticate the transaction request from the device 1000 only when authentication information that is generated by the POS terminal 2000 is of the same type as the authentication information that has been transmitted to the POS terminal 2000.

In operation S308, the POS terminal 2000 generates authentication information based on the user input. The POS terminal 2000 may capture an image of the pupil of the user by using a camera that is included in the POS terminal 2000 or that is connected with the POS terminal 2000. Alternatively, the POS terminal 2000 may record the voice of the user by using a microphone that is included in the POS terminal 2000 or that is connected with the POS terminal 2000. Alternatively, the POS terminal 2000 may recognize the fingerprint of the user by using a fingerprint recognizing apparatus that is included in the POS terminal 2000 or that is connected with the POS terminal 2000. Alternatively, the POS terminal 2000 may generate an image of the signature that is input from the user via a touch screen that is in the POS terminal 2000 or connected with the POS terminal 2000.

In operation S310, the POS terminal 2000 compares the authentication information that is received from the device 1000 with the authentication information that is generated by the POS terminal 2000. For example, when the authentication information is an image obtained by capturing an image of the pupil of the user, the POS terminal 2000 may compare the pupil image that is received from the device 1000 with the pupil image that is captured by the POS terminal 2000.

Also, for example, when the authentication information is the voice of the user, the POS terminal 2000 may compare voice data of the user that is received from the device 1000 with voice data of the user that is recorded by the POS terminal 2000. In this case, the POS terminal 2000 may determine whether the voice data that is received from the device 1000 and the voice data that is recorded by the POS terminal 2000 are voice data of the same user. Also, the POS terminal 2000 may convert the voice data into text, and may determine whether text that corresponds to the voice data from the device 1000 is equal to the text that corresponds to the voice data that is recorded by the POS terminal 2000.

Also, for example, when the authentication information is a fingerprint image, the POS terminal 2000 may compare the fingerprint image that is received from the device 1000 with a fingerprint image that is generated by the POS terminal 2000. Also, for example, when the authentication information is the signature of the user, the POS terminal 2000 may compare the signature image that is received from the device 1000 with a signature image that is generated by the POS terminal 2000.

In operation S312, the POS terminal 2000 authenticates the transaction request. When the POS terminal 2000 determines that the authentication information from the device 1000 is equal to the authentication information that is generated by the POS terminal 2000, the POS terminal 2000 may authenticate the transaction request that is received from the device 1000.

In operation S314, the device 1000 transmits transaction information to the POS terminal 2000. When the transaction request from the device 1000 is authenticated by the POS terminal 2000, the device 1000 may transmit the transaction information to the POS terminal 2000. The transaction information may be used in a transaction with respect to a product or a service and may include one or more of card information, coupon information, and user information.

In the above, it is described that, after the POS terminal 2000 authenticates the transaction request, the device 1000 provides the transaction information to the POS terminal 2000, but the present inventive concept is not limited thereto. In operation S306, the device 1000 may transmit the authentication information and the transaction information to the POS terminal 2000.

In operation S316, the POS terminal 2000 transmits the transaction information and the authentication information to the server 3000. The POS terminal 2000 may transmit the transaction information and the authentication information, which are received from the device 1000, to the server 3000. Also, the POS terminal 2000 may transmit the authentication information, which is generated by the POS terminal 2000, to the server 3000.

In operation S318, the server 3000 performs the transaction. The server 3000 may perform the transaction, based on the transaction information and the authentication information that are received from the POS terminal 2000. The server 3000 may further safely perform the transaction by using the authentication information that is generated by the device 1000 and the authentication information that is generated by the POS terminal 2000.

Figure 4:
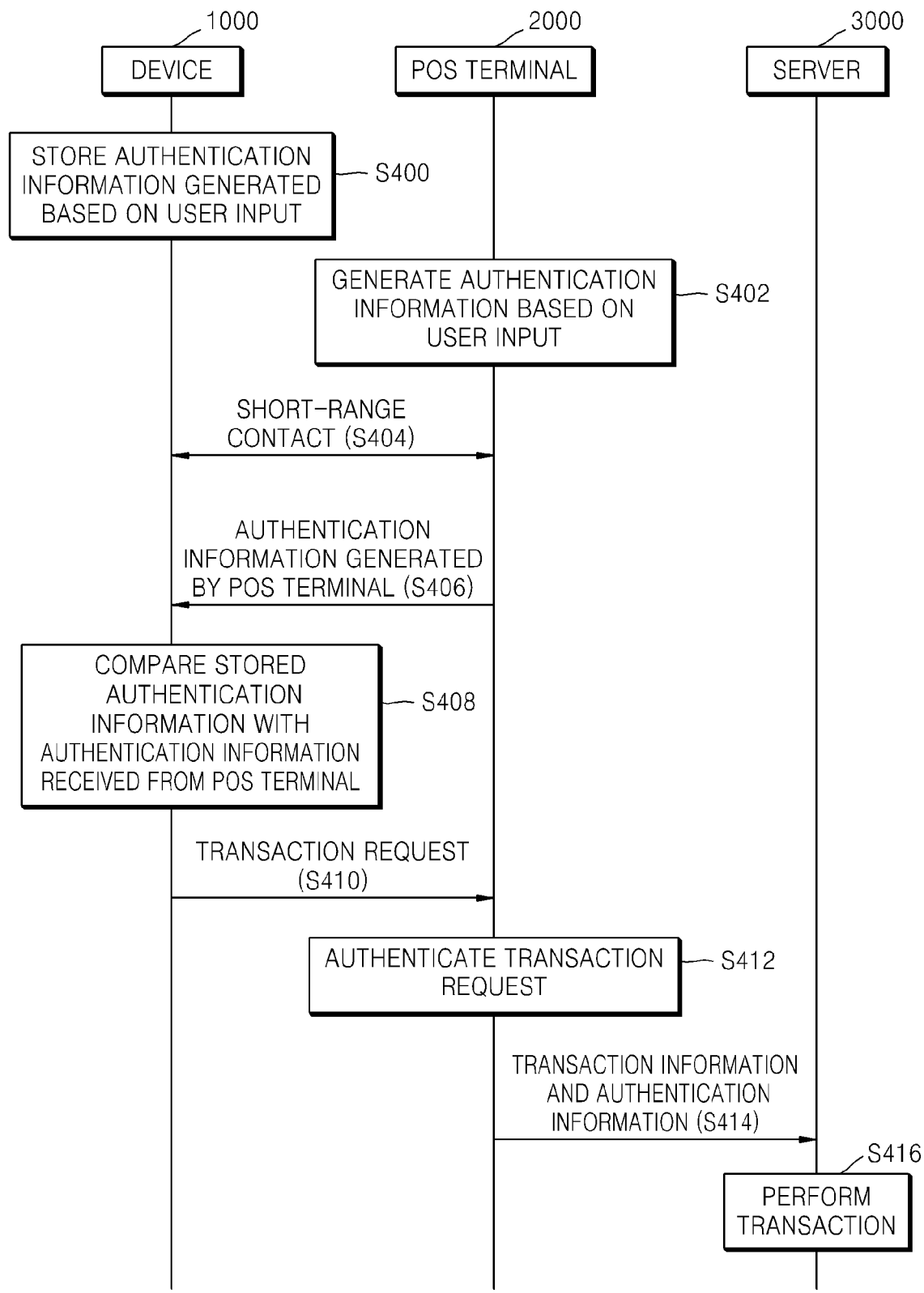
FIG. 4 is a flowchart of a method of authenticating, by the POS terminal, a transaction request from the device in the transaction request authenticating system, according to another exemplary embodiment.

FIG. 4 is a flowchart of a method of authenticating, by the POS terminal 2000, a transaction request from the device 1000 in the transaction request authenticating system, according to another exemplary embodiment. In the exemplary embodiment of FIG. 4, the device 1000 may compare authentication information that is generated by the device 1000 with authentication information that is generated by the POS terminal 2000.

In operation S400, the device 1000 stores authentication information that is input by a user. The device 1000 may generate the authentication information by using at least one of a camera, a microphone, a fingerprint recognizing apparatus, and a touch screen, and may previously store the authentication information in a memory of the device 1000. Alternatively, the device 1000 may store the authentication information in a separate storage space.

In operation S402, the POS terminal 2000 generates authentication information, based on a user input. The POS terminal 2000 may capture an image of a pupil of the user by using a camera that is included in the POS terminal 2000 or that is connected with the POS terminal 2000. Also, the POS terminal 2000 may record a voice of the user by using a microphone that is included in the POS terminal 2000 or that is connected with the POS terminal 2000. Also, the POS terminal 2000 may recognize a fingerprint of the user by using a fingerprint recognizing apparatus that is included in the POS terminal 2000 or that is connected with the POS terminal 2000. Also, the POS terminal 2000 may generate an image of a signature that is input from the user to a touch screen that is included in the POS terminal 2000 or that is connected with the POS terminal 2000.

In operation S404, the device 1000 performs a short-range contact with the POS terminal 2000. The device 1000 and the POS terminal 2000 may approach each other to within a predetermined range, and once the device 1000 and the POS terminal 2000 are within the predetermined range, the device 1000 and the POS terminal 2000 may be connected to each other via an NFC network. The connection between the device 1000 and the POS terminal 2000 may be established by exchanging messages between the device 1000 and the POS terminal 2000.

In operation S406, the POS terminal 2000 transmits the authentication information, which is generated by the POS terminal 2000, to the device 1000. Since the POS terminal 2000 is within the predetermined range of the device 1000, the POS terminal 2000 may transmit information about at least one of the pupil image of the user, the voice of the user, the fingerprint of the user, and the signature of the user to the device 1000. The POS terminal 2000 may store the authentication information in a separate storage space and may transmit link information for downloading the authentication information to the device 1000. The device 1000 may then use the link information to download the authentication information from the separate storage space of the POS terminal 2000.

In operation S408, the device 1000 compares the authentication information that is received from the POS terminal 2000 with the authentication information that is generated by the device 1000. For example, when the authentication information corresponds to the image obtained by capturing an image of the pupil of the user, the device 1000 may compare the pupil image that is received from the POS terminal 2000 with a pupil image that is generated by the device 1000.

Alternatively, for example, when the authentication information corresponds to the voice of the user, the device 1000 may compare voice data of the user that is received from the POS terminal 2000 with voice data of the user that is recorded by the device 1000. In this case, the device 1000 may determine whether the voice data from the POS terminal 2000 and the voice data that is recorded by the device 1000 are from the same user, based on a frequency and a pattern of the voice data. Also, the device 1000 may convert the voice data into text, and may determine whether text that corresponds to the voice data from the POS terminal 2000 is equal to the text that corresponds to the voice data that is recorded by the device 1000.

Also, when the authentication information corresponds to a fingerprint image of the user, the device 1000 may compare a fingerprint image that is received from the POS terminal 2000 with a fingerprint image that is generated by the device 1000. Also, when the authentication information corresponds to a signature of the user, the device 1000 may compare a signature image that is received from the POS terminal 2000 with a signature image that is generated by the device 1000.

In operation S410, the device 1000 requests a transaction with the POS terminal 2000. When the authentication information that is received from the POS terminal 2000 is equal to the authentication information that is generated by the device 1000, the device 1000 may request a transaction with the POS terminal 2000. The device 1000 may request the transaction with the POS terminal 2000 and simultaneously may provide transaction information and the authentication information that is generated by the device 1000 to the POS terminal 2000. The transaction information may be used in a transaction with respect to a product or a service and may include one or more of card information, coupon information, and user information. Also, in operation S410, once the device 1000 is within the predetermined distance of the POS terminal 2000, the device 1000 may request the transaction with the POS terminal 2000.

In operation S412, the POS terminal 2000 authenticates the transaction request. When the POS terminal 2000 determines that the authentication information that is received from the device 1000 is equal to the authentication information that is generated by the POS terminal 2000, the POS terminal 2000 may authenticate the transaction request that is received from the device 1000.

In operation S414, the POS terminal 2000 transmits the transaction information and the authentication information to the server 3000. The POS terminal 2000 transmits the transaction information and the authentication information that are received from the device 1000 to the server 3000. Also, the POS terminal 2000 may transmit the authentication information that is generated by the POS terminal 2000 to the server 3000.

In operation S416, the server 3000 performs the transaction. The server 3000 may perform the transaction, based on the transaction information and the authentication information that are received from the POS terminal 2000. The server 3000 may perform the transaction, by using the authentication information that is generated by the device 1000 and the authentication information that is generated by the POS terminal 2000.

Figure 5:
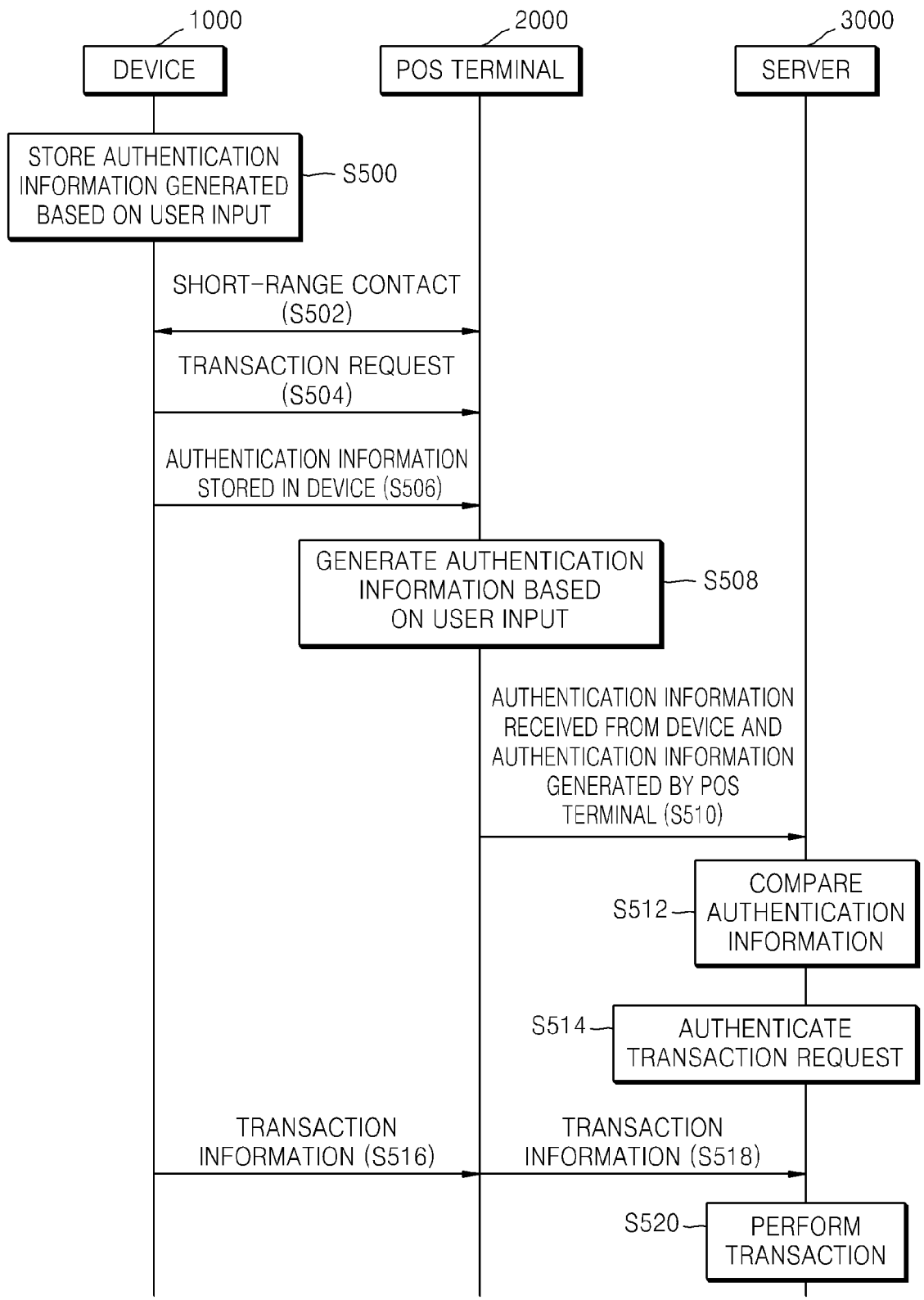
FIG. 5 is a flowchart of a method of authenticating, by a server, a transaction request from the device in the transaction request authenticating system, according to an exemplary embodiment.

FIG. 5 is a flowchart of a method of authenticating, by the server 3000, a transaction request from the device 1000 in the transaction request authenticating system, according to an exemplary embodiment. In the exemplary embodiment of FIG. 5, the server 3000 may compare authentication information that is generated by the device 1000 with authentication information that is generated by the POS terminal 2000.

In operation S500, the device 1000 stores authentication information that is input by a user. The authentication information is used in authentication of the transaction request from the device 1000. The device 1000 may generate the authentication information by using at least one of a camera, a microphone, a fingerprint recognizing apparatus, and a touch screen, and may previously store the authentication information in a memory of the device 1000. Alternatively, the device 1000 may store the authentication information in a separate storage space.

In operation S502, the device 1000 performs a short-range contact with the POS terminal 2000. The device 1000 and the POS terminal 2000 may approach each other to within a predetermined range, and once the device 1000 and the POS terminal 2000 are within the predetermined range, the device 1000 and the POS terminal 2000 may be connected to each other via an NFC network. The connection between the device 1000 and the POS terminal 2000 may be established by exchanging messages between the device 1000 and the POS terminal 2000.

In operation S504, the device 1000 requests a transaction with the POS terminal 2000. In operation S504, once the device 1000 is within the predetermined distance of the POS terminal 2000, the device 1000 may request the transaction with the POS terminal 2000.

In operation S506, the device 1000 transmits the authentication information that is stored in the device 1000 to the POS terminal 2000. Once the device 1000 is within the predetermined distance of the POS terminal 2000, the device 1000 may extract information about at least one of a pupil image of the user, a voice of the user, a fingerprint of the user, and a signature of the user from the memory or the separate storage space, and may transmit the extracted information to the POS terminal 2000. The device 1000 may store the authentication information in the separate storage space and may transmit link information for downloading the authentication information to the POS terminal 2000. The POS terminal 2000 may then use the link information to download the authentication information from the separate storage space of the device 1000.

Also, the device 1000 may display a user interface for an input of a password on a screen of the device 1000, and when the password is correctly input by the user, the device 1000 may provide the authentication information to the POS terminal 2000.

Also, according to a payment amount or types of an item to be purchased, the device 100 may transmit a preset type of authentication information to the POS terminal 2000. For example, the user may previously set types of the authentication information according to a payment amount or types of an item to be purchased, and the device 1000 may transmit the preset type of the authentication information to the POS terminal 2000. However, the present inventive concept is not limited thereto, and thus, the user may randomly preset types of the authentication information to be used. Also, when the device 1000 has transmitted the preset type of the authentication information to the POS terminal 2000, the POS terminal 2000 may authenticate the transaction request from the device 1000 only when authentication information that is generated by the POS terminal 2000 is of the same type as the authentication information that has been transmitted to the POS terminal 2000.

In operation S508, the POS terminal 2000 generates authentication information based on the user input. The POS terminal 2000 may capture an image of a pupil of the user by using a camera that is included in the POS terminal 2000 or that is connected with the POS terminal 2000. Alternatively, the POS terminal 2000 may record a voice of the user by using a microphone that is included in the POS terminal 2000 or that is connected with the POS terminal 2000. Alternatively, the POS terminal 2000 may recognize a fingerprint of the user by using a fingerprint recognizing apparatus that is included in the POS terminal 2000 or that is connected with the POS terminal 2000. Alternatively, the POS terminal 2000 may generate an image of a signature that is input from the user via a touch screen that is included in the POS terminal 2000 or that is connected with the POS terminal 2000.

In operation S510, the POS terminal 2000 transmits the authentication information that is received from the device 1000 and the authentication information that is generated by the POS terminal 2000 to the server 3000.

In operation S512, the server 3000 compares the authentication information that is generated by the device 1000 with the authentication information that is generated by the POS terminal 2000. For example, when the authentication information is an image obtained by capturing an image of the pupil of the user, the server 3000 may compare a pupil image that is generated by the device 1000 with a pupil image that is generated by the POS terminal 2000.

Also, for example, when the authentication information is the voice of the user, the server 3000 may compare voice data of the user that is generated by the device 1000 with voice data of the user that is generated by the POS terminal 2000. In this case, the server 3000 may determine whether the voice data that is generated by the device 1000 and the voice data that is generated by the POS terminal 2000 are voice data of the same user. Also, the server 3000 may convert the voice data into text, and may determine whether text that corresponds to the voice data that is generated by the device 1000 is equal to text that corresponds to the voice data that is generated by the POS terminal 2000.

Also, for example, when the authentication information is a fingerprint image of the user, the server 3000 may compare a fingerprint image that is generated by the device 1000 with a fingerprint image that is generated by the POS terminal 2000. Also, for example, when the authentication information is the signature of the user, the server 3000 may compare a signature image that is generated by the device 1000 with a signature image that is generated by the POS terminal 2000.

In operation S514, the server 3000 authenticates the transaction request. When the server 3000 determines that the authentication information that is generated by the device 1000 is equal to the authentication information that is generated by the POS terminal 2000, the server 3000 may authenticate the transaction request from the device 1000.

In operation S516, the device 1000 transmits the transaction information to the POS terminal 2000, and in operation S518, the POS terminal 2000 transmits the transaction information to the server 3000. When the server 3000 authenticates the transaction request from the device 1000, the device 1000 may transmit the transaction information to the POS terminal 2000. The transaction information may be used in a transaction with respect to a product or a service and may include card information, coupon information, and user information.

In the above, it is described that, after the server 3000 authenticates the transaction request, the device 1000 provides the transaction information to the POS terminal 2000, but the present inventive concept is not limited thereto. In operation S506, the device 1000 may transmit the authentication information and the transaction information to the POS terminal 2000.

In operation S520, the server 3000 performs the transaction. The server 3000 may perform the transaction, based on the transaction information and the authentication information that are received from the POS terminal 2000. The server 3000 may perform the transaction by using both of the authentication information that is generated by the device 1000 and the authentication information that is generated by the POS terminal 2000.

Figure 6:
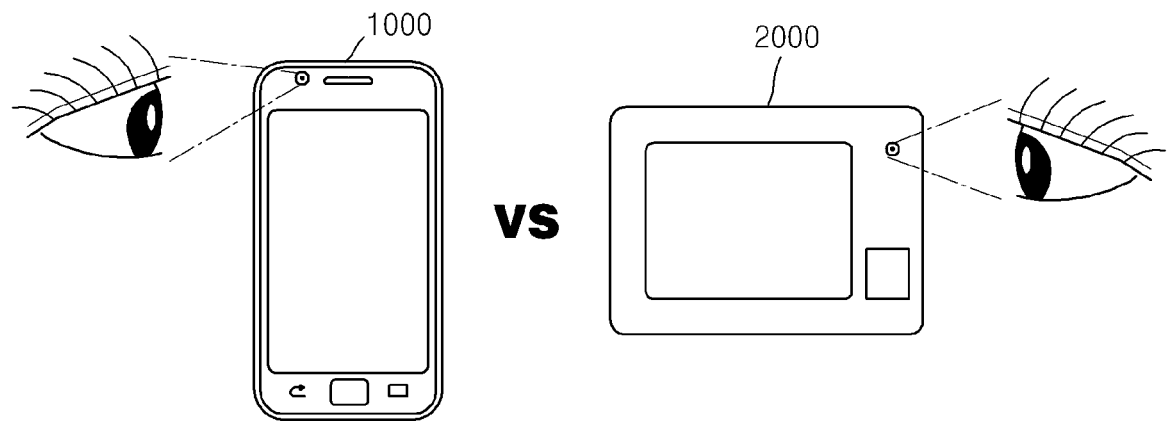
FIG. 6 illustrates an example in which each of the device and the POS terminal obtains authentication information by capturing an image of a pupil of a user, according to an exemplary embodiment.

FIG. 6 illustrates an example in which each of the device 1000 and the POS terminal 2000 obtains authentication information by capturing an image of a pupil of a user, according to an exemplary embodiment.

Referring to FIG. 6, the device 1000 may capture the image of the pupil of the user by using a camera included in the device 1000, and the POS terminal 2000 may capture the image of the pupil of the user by using a camera included in the POS terminal 2000. The device 1000 may capture the image of the pupil of the user and may previously store the pupil image, and once the device 1000 and the POS terminal 2000 approach each other to within a predetermined range, the POS terminal 2000 may capture the image of the pupil of the user and then may generate the pupil image. Also, the pupil image that is generated by the device 1000 and the pupil image that is generated by the POS terminal 2000 may be compared to each other, and the comparison may be used in authentication of a transaction request from the device 1000.

Figure 7:
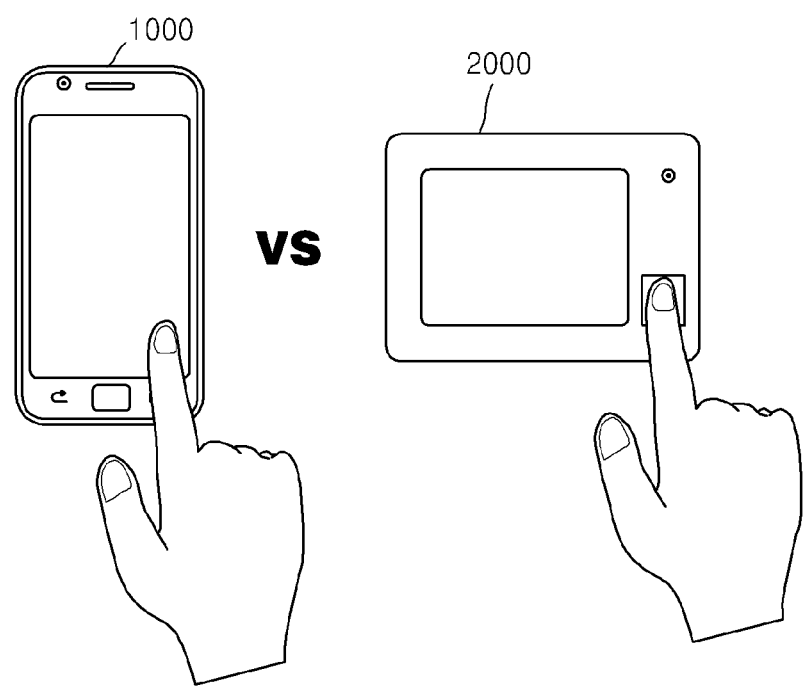
FIG. 7 illustrates an example in which each of the device and the POS terminal obtains authentication information by recognizing a fingerprint of a user, according to an exemplary embodiment.

FIG. 7 illustrates an example in which each of the device 1000 and the POS terminal 2000 obtains authentication information by recognizing a fingerprint of a user, according to an exemplary embodiment.

Referring to FIG. 7, the device 1000 may recognize the fingerprint of the user by using a touch screen included in the device 1000, and the POS terminal 2000 may recognize the fingerprint of the user by using a fingerprint recognizing apparatus included in the POS terminal 2000. The device 1000 may recognize the fingerprint of the user and may previously store a fingerprint image, and once the device 1000 and the POS terminal 2000 approach each other to within a predetermined range, the POS terminal 2000 may recognize the fingerprint of the user and may generate a fingerprint image. Also, the fingerprint image that is generated by the device 1000 and the fingerprint image that is generated by the POS terminal 2000 may be compared to each other, and the comparison may be used in authentication of a transaction request from the device 1000.

Figure 8:
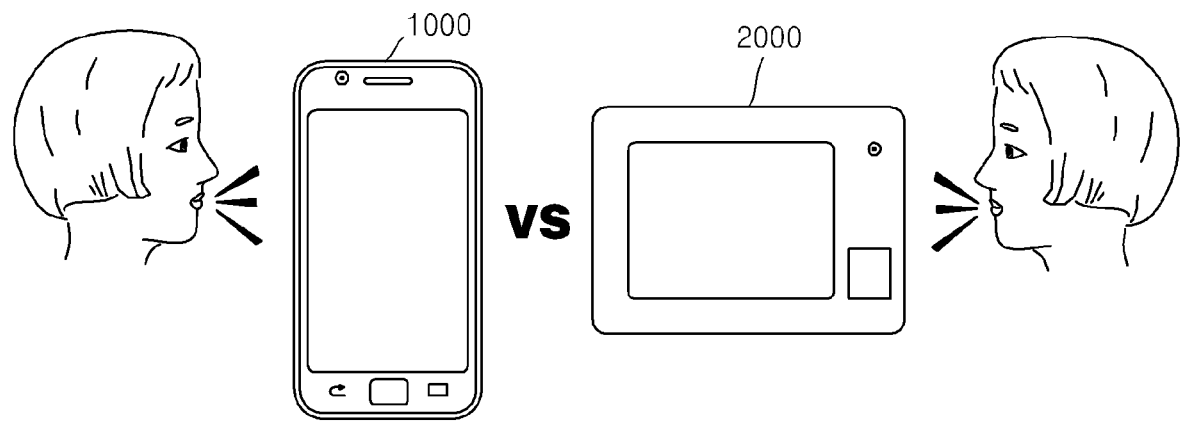
FIG. 8 illustrates an example in which each of the device and the POS terminal obtains authentication information by recording a voice of a user, according to an exemplary embodiment.

FIG. 8 illustrates an example in which each of the device 1000 and the POS terminal 2000 obtains authentication information by recording a voice of a user, according to an exemplary embodiment.

Referring to FIG. 8, the device 1000 may record the voice of the user by using a microphone included in the device 1000, and the POS terminal 2000 may record the voice of the user by using a microphone included in the POS terminal 2000. The device 1000 may record the voice of the user and may previously store voice data, and once the device 1000 and the POS terminal 2000 approach each other to within a predetermined range, the POS terminal 2000 may record the voice of the user and then may generate voice data. Also, the voice data that is generated by the device 1000 and the voice data that is generated by the POS terminal 2000 may be compared to each other, and the comparison may be used in authentication of a transaction request from the device 1000.

Figure 9:
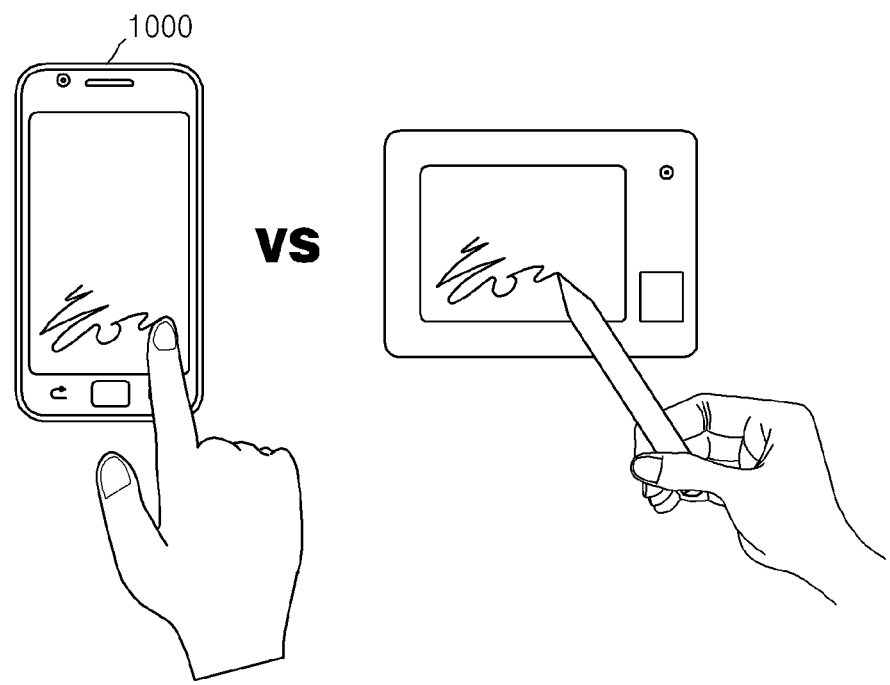
FIG. 9 illustrates an example in which each of the device and the POS terminal obtains authentication information by receiving a signature of a user, according to an exemplary embodiment.

FIG. 9 illustrates an example in which each of the device 1000 and the POS terminal 2000 obtains authentication information by receiving a signature of a user, according to an exemplary embodiment.

Referring to FIG. 9, the device 1000 may generate a signature image of the user by using a touch screen included in the device 1000, and the POS terminal 2000 may generate a signature image of the user by using a touch screen included in the POS terminal 2000. The device 1000 may previously store the signature image of the user, and once the device 1000 and the POS terminal 2000 approach each other to within a predetermined range, the POS terminal 2000 may generate the signature image of the user. Also, the signature image that is generated by the device 1000 and the signature image that is generated by the POS terminal 2000 may be compared to each other, and the comparison may be used in authentication of a transaction request from the device 1000.

Figure 10B:
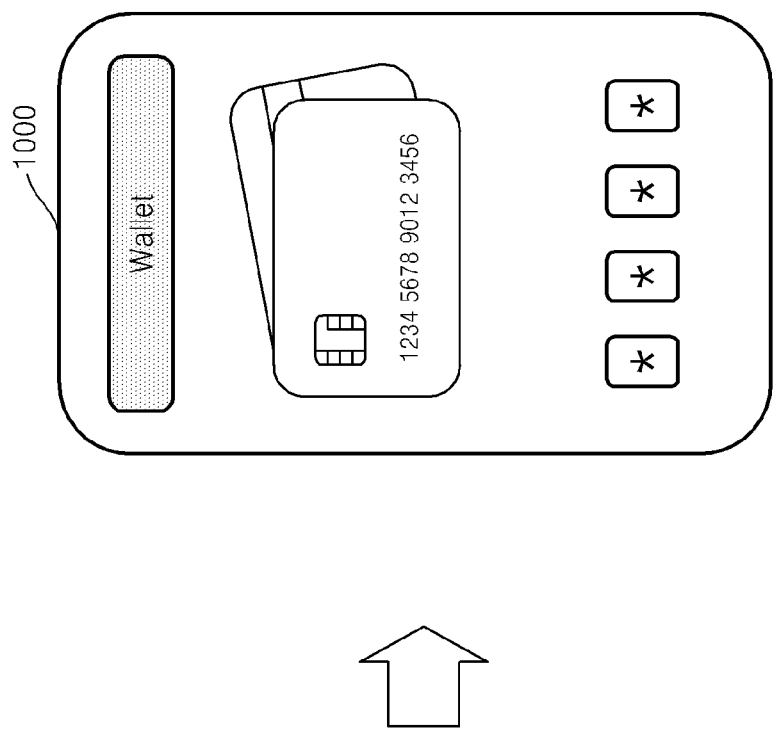
FIGS. 10A and 10B illustrate execution screens of a transaction application that is executed in the device, according to an exemplary embodiment.
Figure 10A:
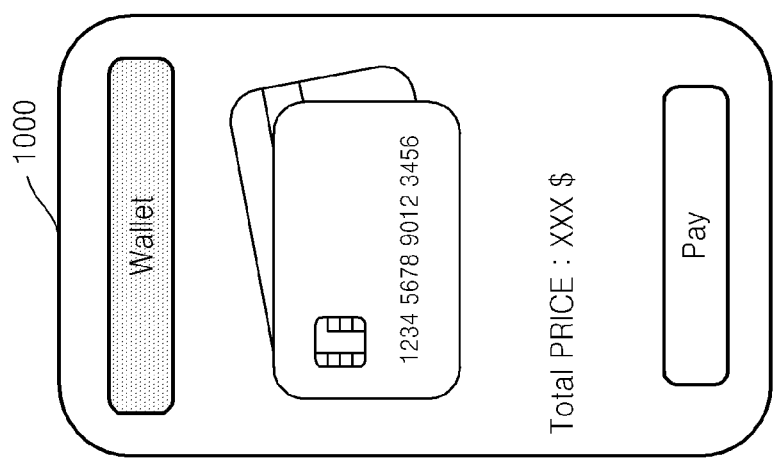

FIGS. 10A and 10B illustrate execution screens of a transaction application that is executed in the device 1000, according to an exemplary embodiment.

As illustrated in FIG. 10A, when the transaction application is executed in the device 1000, a credit card to be used in transaction and a transaction amount may be displayed on a screen of the device 1000. Also, when a user selects a button for transaction, as illustrated in FIG. 10B, a user interface for an input of a password may be displayed. When the user inputs the password via the displayed user interface, the device 1000 may generate authentication information by capturing an image of a pupil of the user, by recording a voice of the user, by recognizing a fingerprint of the user, or by receiving a signature of the user. In this case, the authentication information that is generated by the device 1000 may match with the credit card as displayed in FIG. 10A, and may be stored. Thus, a plurality of pieces of authentication information that are different from one other may be respectively matched with credit cards of the user.

In the above, it is described that, after the credit card and the transaction amount are displayed, the device 1000 generates the authentication information, but the present inventive concept is not limited thereto. Thus, the device 1000 may match predetermined authentication information with at least one of the credit card and the transaction amount. Also, it is possible that the device 1000 does not match predetermined authentication information with the credit card and the transaction amount.

Figure 11:
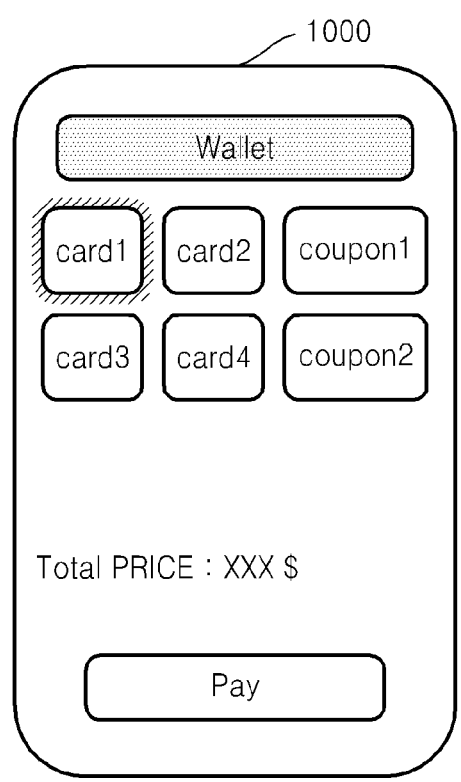
FIG. 11 illustrates an example in which a credit card for a transaction is selected in the device, according to an exemplary embodiment.

FIG. 11 illustrates an example in which a credit card for a transaction is selected in the device 1000, according to an exemplary embodiment.

As illustrated in FIG. 11, in the present exemplary embodiment, when a plurality of transaction means (e.g., credit cards, coupons, etc.) exist, the device 1000 may output a list of the plurality of transaction means on its screen. A user may select a predetermined transaction means from the list of the plurality of transaction means that are displayed on the screen.

Figure 12B:
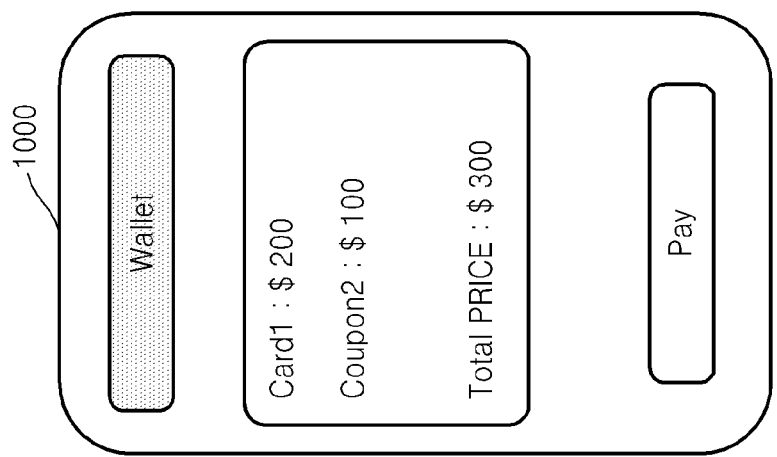
FIGS. 12A and 12B illustrate an example in which a card and a coupon for a transaction are selected in the device, and transaction information is displayed on a screen of the device, according to an exemplary embodiment.
Figure 12A:
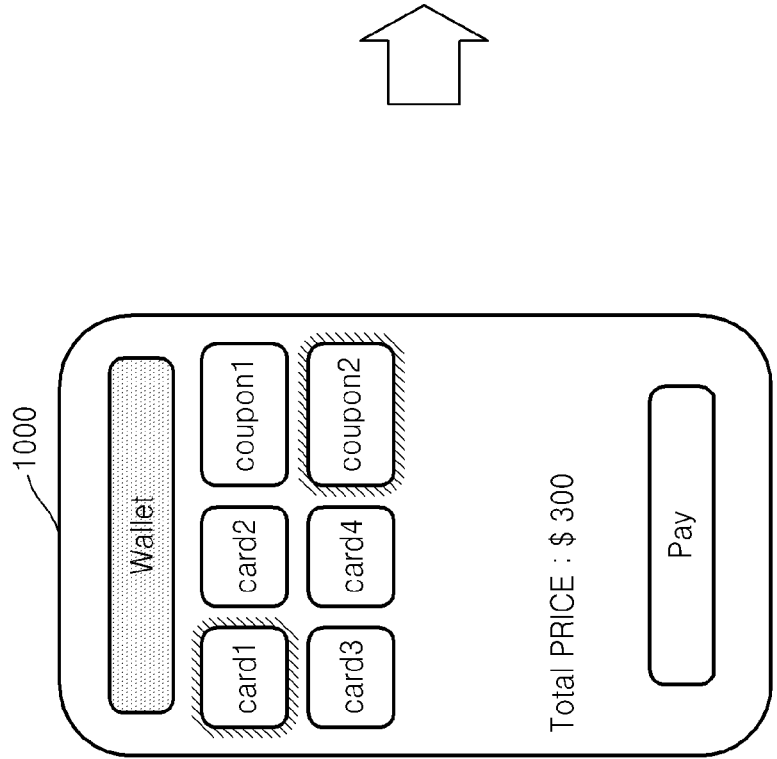

FIGS. 12A and 12B illustrate an example in which a card and a coupon for transaction are selected in the device 1000, and transaction information is displayed on a screen of the device 1000, according to an exemplary embodiment.

As illustrated in FIG. 12A, a user may select a plurality of transaction means (e.g., a card 1 and a coupon 2) from a transaction means list. Here, as illustrated in FIG. 12B, the device 1000 may pay $100 out of a total transaction amount (i.e., $300) by using the coupon 2, and may pay $200 by using the card 1.

Figure 13:
FIG. 13 illustrates an example in which a shopping list (i.e., a shopping cart) is displayed on the device, according to an exemplary embodiment.

FIG. 13 illustrates an example in which a shopping list (i.e., a shopping cart) is displayed on the device 1000, according to an exemplary embodiment.

Referring to FIG. 13, the device 1000 may display a list of a plurality of products and a plurality of pieces of price information that correspond to the plurality of products, respectively, on a screen of the device 1000. In this case, a user may review the plurality of products and prices and then may select a product to buy. For example, when the user selects a product 1 and a product 2, the device 1000 may collectively process a transaction for the products 1 and 2.

Figure 14:
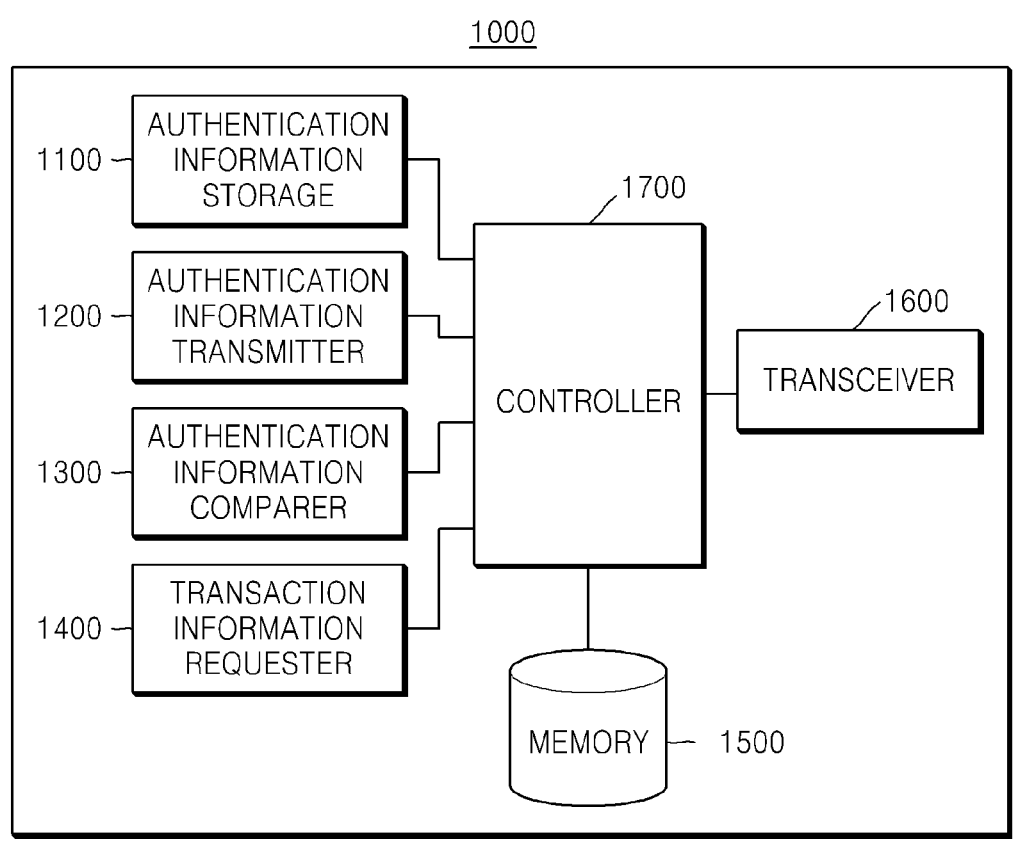
FIG. 14 is a block diagram of the device, according to an exemplary embodiment.

FIG. 14 is a block diagram of the device 1000, according to an exemplary embodiment.

As illustrated in FIG. 14, the device 1000 includes an authentication information storage 1100, an authentication information transmitter 1200, an authentication information comparer 1300, a transaction requester 1400, a memory 1500, a transceiver 1600, and a controller 1700.

The authentication information storage 1100 stores authentication information that is input by a user. The authentication information may be used to authenticate a transaction request from the device 1000 and may include information about at least one of a pupil image of the user, a voice of the user, a fingerprint of the user, and a signature of the user. The authentication information storage 1100 may generate the authentication information by using at least one of a camera, a microphone, a fingerprint recognizing apparatus, and a touch screen, and may previously store the authentication information in the memory 1500 to be described later. However, the present inventive concept is not limited thereto, and thus the authentication information storage 1100 may store the authentication information in a separate storage space.

The authentication information transmitter 1200 transmits the authentication information to the POS terminal 2000. Once the device 1000 and the POS terminal 2000 approach each other to within a predetermined range, the authentication information transmitter 1200 may extract information about at least one of a pupil image of the user, a voice of the user, a fingerprint of the user, and a signature of the user from the memory 1500 or a separate storage space, and may transmit the extracted information to the POS terminal 2000. In a case where the authentication information is stored in the separate storage space, the authentication information providing unit 1200 may transmit link information for downloading the authentication information to the POS terminal 2000.

Also, the device 1000 may display a user interface for an input of a password on a screen of the device 1000, and when the password is correctly input by the user, the authentication information transmitter 1200 may provide the authentication information to the POS terminal 2000.

Also, according to a payment amount or types of an item to be purchased, the authentication information transmitter 1200 may transmit a preset type of authentication information to the POS terminal 2000. For example, the user may previously set types of the authentication information according to a payment amount or types of an item to be purchased, and the authentication information transmitter 1200 may transmit the preset type of the authentication information to the POS terminal 2000. However, the present inventive concept is not limited thereto, and thus, the user may randomly preset types of the authentication information to be used. Also, when the authentication information transmitter 1200 has transmitted the preset type of the authentication information to the POS terminal 2000, the POS terminal 2000 may authenticate the transaction request from the device 1000 only when authentication information that is generated by the POS terminal 2000 is of the same type as the authentication information that has been transmitted to the POS terminal 2000.

The authentication information comparer 1300 compares the authentication information that is received from the POS terminal 2000 with the authentication information that is generated by the device 1000. The POS terminal 2000 may generate the authentication information in a manner different than the device 1000, and may provide the generated authentication information to the device 1000.

For example, when the authentication information corresponds to an image obtained by capturing an image of the pupil of the user, the authentication information comparer 1300 may compare a pupil image that is received from the POS terminal 2000 with a pupil image that is generated by the device 1000.

Alternatively, for example, when the authentication information corresponds to the voice of the user, the authentication information comparer 1300 may compare voice data of the user that is received from the POS terminal 2000 with voice data of the user that is recorded by the device 1000. In this case, the authentication information comparer 1300 may determine whether the voice data from the POS terminal 2000 and the voice data that is generated by the device 1000 are from the same user, based on a frequency and a pattern of the voice data. Also, the authentication information comparer 1300 may convert the voice data into text, and may determine whether text that corresponds to the voice data from the POS terminal 2000 is equal to the text that corresponds to the voice data that is generated by the device 1000.

Also, when the authentication information corresponds to a fingerprint image of the user, the authentication information comparer 1300 may compare a fingerprint image that is received from the POS terminal 2000 with a fingerprint image that is generated by the device 1000. Also, when the authentication information corresponds to a signature of the user, the device 1000 may compare a signature image that is received from the POS terminal 2000 with a signature image that is generated by the device 1000.

The transaction requester 1400 requests transaction. Once the device 1000 and the POS terminal 2000 approach each other to within a predetermined range, the transaction requester 1400 may request the transaction with the POS terminal 2000. Transaction information may be used in transaction with respect to a product or a service and may include one or more of card information, coupon information, and user information.

The memory 1500 stores various types of information that are used for the device 1000 to generate the authentication information, to compare the stored authentication information with the authentication information that is generated by the POS terminal 2000, and to request the transaction with the POS terminal 2000.

The transceiver 1600 exchanges the various types of information with the server 3000 and the POS terminal 2000, wherein the various types of information are used for the device 1000 to generate the authentication information, to compare the stored authentication information with the authentication information that is generated by the POS terminal 2000, and to request the transaction with the POS terminal 2000.

The controller 1700 controls all operations of the device 1000, and controls the authentication information storage 1100, the authentication information transmitter 1200, the authentication information comparer 1300, the transaction requester 1400, the memory 1500, and the transceiver 1600 so as to allow the device 1000 to generate the authentication information, to compare the stored authentication information with the authentication information that is generated by the POS terminal 2000, and to request the transaction with the POS terminal 2000.

Figure 15:
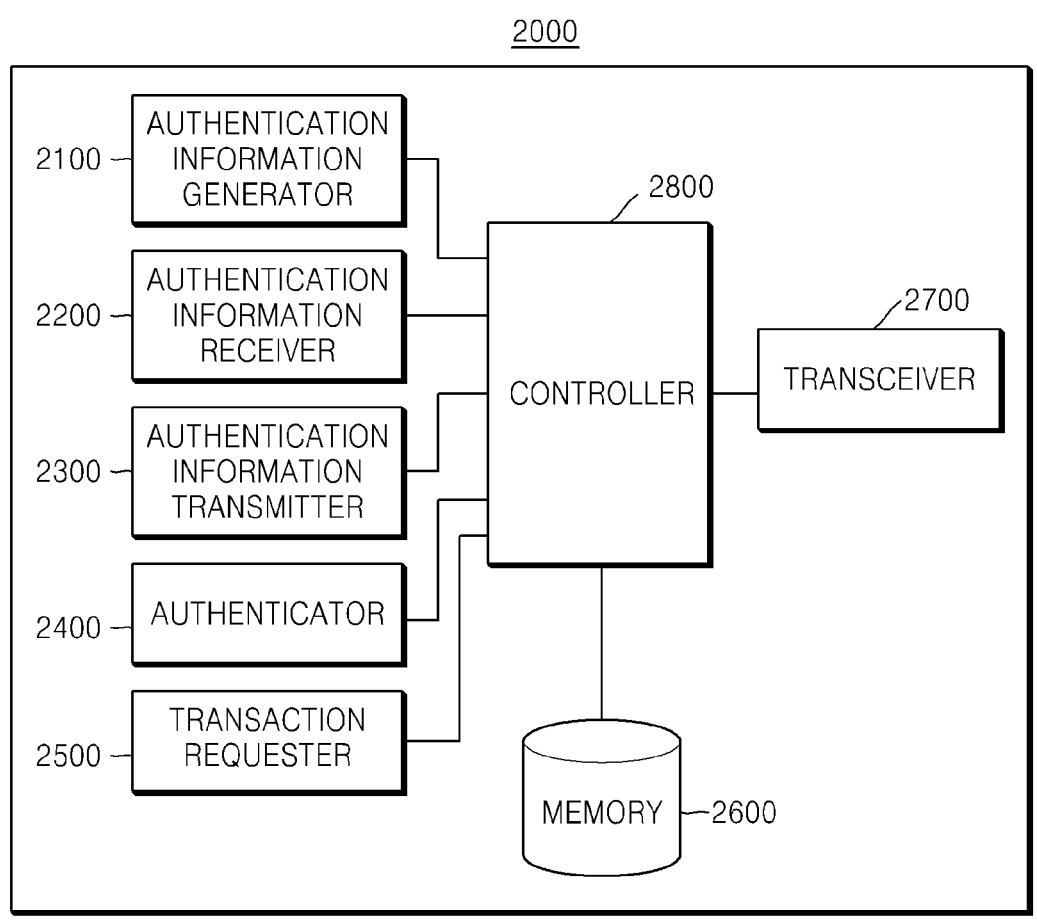
FIG. 15 is a block diagram of the POS terminal, according to an exemplary embodiment.

FIG. 15 is a block diagram of the POS terminal 2000, according to an exemplary embodiment.

As illustrated in FIG. 15, the POS terminal 2000 includes an authentication information generator 2100, an authentication information receiver 2200, an authentication information transmitter 2300, an authenticator 2400, a transaction requester 2500, a memory 2600, a transceiver 2700, and a controller 2800.

The authentication information generator 2100 generates authentication information, based on a user input. The authentication information generator 2100 may capture an image of a pupil of a user by using a camera that is included in the POS terminal 2000 or that is connected with the POS terminal 2000. Also, the authentication information generator 2100 may record a voice of the user by using a microphone that is included in the POS terminal 2000 or that is connected with the POS terminal 2000. Also, the authentication information generator 2100 may recognize a fingerprint of the user by using a fingerprint recognizing apparatus that is included in the POS terminal 2000 or that is connected with the POS terminal 2000. Also, the authentication information generator 2100 may generate an image of a signature that is input from the user to a touch screen that is included in the POS terminal 2000 or that is connected with the POS terminal 2000.

The authentication information receiver 2200 receives authentication information, which is stored in the device 1000, from the device 1000. Once the device 1000 approaches the POS terminal 2000 to within a predetermined range, the device 1000 may extract information about at least one of a pupil image of the user, a voice of the user, a fingerprint of the user, and a signature of the user from the memory 1500 or a separate storage space, and may transmit the extracted information to the POS terminal 2000. In a case where the device 1000 stores the authentication information in the separate storage space, the authentication information receiver 2200 may receive link information for downloading the authentication information from the device 1000.

The authentication information transmitter 2300 provides the authentication information that is generated by the authentication information generator 2100 to the device 1000. Once the POS terminal 2000 approaches the device 1000 to within a predetermined range, the authentication information transmitter 2300 may transmit information about at least one of a pupil image of the user, a voice of the user, a fingerprint of the user, and a signature of the user to the device 1000. In a case where the POS terminal 2000 stores the authentication information in a separate storage space, the authentication information transmitter 2300 may transmit link information for downloading the authentication information to the device 1000.

The authenticator 2400 authenticates a transaction request from the device 1000. When the authenticator 2400 determines that the authentication information that is received from the device 1000 is equal to the authentication information that is generated by the POS terminal 2000, the authenticator 2400 may authenticate the transaction request that is received from the device 1000.

Also, according to a payment amount or types of an item to be purchased, the device 100 may transmit a preset type of authentication information to the POS terminal 2000. For example, the user may previously set types of the authentication information according to a payment amount or types of an item to be purchased, and the device 1000 may transmit the preset type of the authentication information to the POS terminal 2000. However, the present inventive concept is not limited thereto, and thus, the user may randomly preset types of the authentication information to be used.

When the device 1000 has transmitted the preset type of the authentication information to the POS terminal 2000, the authenticator 2400 may authenticate the transaction request from the device 1000 only when authentication information that is generated by the POS terminal 2000 is of the same type as the authentication information that has been transmitted to the POS terminal 2000.

The transaction requester 2500 requests a transaction with the server 3000. The transaction requester 2500 may transmit transaction information and the authentication information to the server 3000. The transaction requester 2500 may transmit transaction information and the authentication information, which are received from the device 1000, to the server 3000. Also, the transaction requester 2500 may transmit the authentication information that is generated by the POS terminal 2000 to the server 3000.

The memory 2600 stores various types of information that are used for the POS terminal 2000 to generate the authentication information, to compare the authentication information that is generated by the POS terminal 2000 with the authentication information that is received from the device 1000, and to request the transaction with the server 3000.

The transceiver 2700 exchanges the various types of information with the device 1000 and the server 3000, wherein the various types of information are used for the POS terminal 2000 to generate the authentication information, to compare the authentication information that is generated by the POS terminal 2000 with the authentication information that is received from the device 1000, and to request the transaction with the server 3000.

The controller 2800 controls all operations of the POS terminal 2000, and controls the authentication information generator 2100, the authentication information receiver 2200, the authentication information transmitter 2300, the authenticator 2400, the transaction requester 2500, the memory 2600, and the transceiver 2700 so as to allow the POS terminal 2000 to generate the authentication information, to compare the authentication information that is generated by the POS terminal 2000 with the authentication information that is received from the device 1000, and to request the transaction with the server 3000.

The one or more exemplary embodiments of the present invention may be embodied as a recording medium, e.g., a program module to be executed in computers, which include computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all of volatile and non-volatile medium, and detachable and non-detachable medium that are designed to store information including computer readable commands, data structures, program modules or other data. The communication medium includes computer-readable commands, a data structure, a program module, and other transmission mechanisms, and includes other information transmission mediums.

The present inventive concept may, however, be embodied in many different forms and should not be construed as being limited to the exemplary embodiments set forth herein; rather, these exemplary embodiments are provided so that this disclosure will be thorough and complete, and will fully convey the inventive concept to those of ordinary skill in the art. For example, configuring elements that are singular forms may be executed in a distributed fashion, and also, configuring elements that are distributed may be combined and then executed.

While the present inventive concept has been particularly shown and described with reference to exemplary embodiments thereof, it will be understood by those of ordinary skill in the art that various changes in form and details may be made therein without departing from the spirit and scope as defined by the following claims.

What is claimed is:

1. A device comprising:
    a controller that is configured to receive a password input by a user, and in response to the password being correctly input by the user, display a graphical user interface (GUI) for obtaining at least one authentication information based on a user input to the device through the displayed GUI by controlling at least one of a camera, a microphone, a fingerprint recognizing apparatus and a touch screen;
    a memory that is configured to store the obtained at least one authentication information; and
    a transceiver that is configured to receive authentication information, which is generated by a point of sale (POS) terminal based on a user input of the user to the POS terminal, from the POS terminal, when the device enters within a predetermined range from the POS terminal after the user of the device is authenticated by the device based on the password input by the user,
    wherein the controller is configured to compare the obtained at least one authentication information with the received authentication information, and provide the obtained at least one authentication information, and card information which is used in a transaction with respect to a product or a service to the POS terminal based on a result of the comparison,
    wherein the controller is configured to obtain a plurality of types of the authentication information and preset the plurality of types of the authentication information according to payment amounts of the product or the service, in response to the password being correctly input by the user,
    wherein a type of the authentication information from among the plurality of types of the authentication information is determined according to a payment amount of the product or the service to be purchased based on a user input, and
    wherein the controller is configured to compare the determined type to a type of the received authentication information, and provide the obtained at least one authentication information, coupon information and the card information when the determined type is the same as the type of the received authentication information and the obtained at least one authentication information corresponds to the received authentication information,
    wherein the provided at least one authentication information is compared, by the POS terminal, to the authentication information generated by the POS terminal for authenticating the transaction.

2. The device of claim 1, wherein the provided card information is transmitted from the POS terminal to a transaction server.

3. The device of claim 2, wherein the card information that is provided to the transaction server is used by the transaction server to perform the transaction with respect to the product or the service.

4. The device of claim 2, wherein the controller is configured to provide the coupon information which is used in the transaction with respect to the product or the service to the POS terminal.

5. The device of claim 1, wherein the obtained at least one authentication information includes at least one of an image of a pupil of the user, a voice of the user, a fingerprint of the user, and a signature of the user.

6. The device of claim 1, wherein the controller is configured to provide one of the plurality of types of the authentication information to the POS terminal, and the provided one of the plurality of types of the authentication information is transmitted from the POS terminal to a transaction server.

7. The device of claim 6, wherein the one of the plurality of types of the authentication information that is provided to the transaction server is used by the transaction server to perform the transaction with respect to the product or the service.

8. The device of claim 1, wherein the controller is configured to transmit a transaction request for the transaction to the POS terminal, and the transaction request is authenticated based on the result of the comparison.

9. The device of claim 1, wherein the plurality of types of the authentication information comprise a pupil, a voice, a fingerprint, and a signature of the user.

10. A method of requesting, by a device, a transaction with a point of sale (POS) terminal, the method comprising:
    receiving a password input by a user;
    in response to the password being correctly input by the user, displaying a graphical user interface (GUI) on the device for obtaining at least one authentication information;
    obtaining the at least one authentication information based on a user input to the device through the GUI by controlling at least one of a camera, a microphone, a fingerprint recognizing apparatus and a touch screen;
    storing the obtained at least one authentication information; and
    receiving authentication information, which is generated by the POS terminal based on a user input of the user to the POS terminal, from the POS terminal when the device enters within a predetermined range from the POS terminal after the user of the device is authenticated by the device based on the password input by the user,
    comparing the obtained at least one authentication information with the received authentication information, and
    providing the obtained at least one authentication information, coupon information and card information which is used in the transaction with respect to a product or a service to the POS terminal, based on a result of the comparing, wherein the obtaining the at least one authentication information comprises obtaining a plurality of types of the authentication information and presetting the plurality of types of the authentication information according to payment amounts of the product or the service, in response to the password being correctly input by the user, wherein a type of the authentication information from among the plurality of types of the authentication information is determined according to a payment amount of the product or the service to be purchased based on a user input, and wherein the providing the obtained at least one authentication information, the coupon information, and the card information comprises comparing the determined type to a type of the received authentication information, and providing the obtained at least one authentication information, the coupon information, and the card information when the determined type is the same as the type of the received authentication information and the obtained at least one authentication information corresponds to the received authentication information, wherein the provided at least one authentication information is compared, by the POS terminal, to the authentication information generated by the POS terminal for authenticating the transaction.

11. The method of claim 10, wherein the provided card information is transmitted from the POS terminal to a transaction server.

12. The method of claim 11, wherein the card information that is provided to the transaction server is used by the transaction server to perform the transaction with respect to the product or the service.

13. The method of claim 11, further comprising:
providing the coupon information which is used in the transaction with respect to the product or the service to the POS terminal.

14. The method of claim 10, wherein the obtained at least one authentication information includes at least one of an image of a pupil of the user, a voice of the user, a fingerprint of the user, and a signature of the user.

15. The method of claim 10, further comprising:
providing one of the plurality of types of the authentication information to the POS terminal, and
wherein the provided one of the plurality of types of the authentication information is transmitted from the POS terminal to a transaction server.

16. The method of claim 15, wherein the one of the plurality of types of the authentication information that is provided to the transaction server is used by the transaction server to perform the transaction with respect to the product or the service.

17. The method of claim 10, further comprising:
transmitting a transaction request requesting the transaction to the POS terminal, and
wherein the transaction request is authenticated based on the result of the comparing.

18. The method of claim 10, wherein the plurality of types of the authentication information comprise a pupil, a voice, a fingerprint, and a signature of the user.

* * * * *